United States Patent
Lin et al.

(10) Patent No.: US 8,953,063 B2
(45) Date of Patent: Feb. 10, 2015

(54) METHOD FOR WHITE BALANCE ADJUSTMENT

(71) Applicant: Hon Hai Precision Industry Co., Ltd., New Taipei (TW)

(72) Inventors: Kuo-Hung Lin, New Taipei (TW); Tzong-Yi Li, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/905,156

(22) Filed: May 30, 2013

(65) Prior Publication Data
US 2014/0104454 A1    Apr. 17, 2014

(30) Foreign Application Priority Data
Oct. 16, 2012   (TW) .............................. 101138141 A

(51) Int. Cl.
*H04N 9/73*   (2006.01)

(52) U.S. Cl.
CPC .................................... *H04N 9/735* (2013.01)
USPC ...................................................... 348/223.1

(58) Field of Classification Search
CPC ......... H04N 9/735; H04N 9/73; H04N 9/045; H04N 1/6068; H04N 5/2351
See application file for complete search history.

(56) References Cited

U.S. PATENT DOCUMENTS

| | | | | |
|---|---|---|---|---|
| 6,995,791 | B2 * | 2/2006 | Skow | 348/223.1 |
| 7,791,649 | B2 * | 9/2010 | Kim et al. | 348/223.1 |
| 8,547,450 | B2 * | 10/2013 | Zhang | 348/223.1 |
| 2007/0133071 | A1 * | 6/2007 | Noyes et al. | 358/516 |
| 2009/0009624 | A1 * | 1/2009 | Liu | 348/223.1 |

* cited by examiner

*Primary Examiner* — Luong T Nguyen
(74) *Attorney, Agent, or Firm* — Novak Druce Connolly Bove + Quigg LLP

(57) ABSTRACT

A white balance adjustment method includes capturing a raw image by an image capturing device, setting an initial maximum and an initial minimum threshold values of each channels, and obtaining a reference white and a reference black. Color scale values of each R, G, and B channels are extracted and a minimum, a maximum, and an average values of the color scale values corresponding to each channels are obtained. A modulation factor of each channel is defined by using above defined three values, according to the modulation factor of each channels to re-define a new maximum threshold value as a reference white and a new minimum threshold value as a reference black. According to the obtained reference black and the reference white to complete the white balance adjustment of the image.

3 Claims, 5 Drawing Sheets

METHOD FOR WHITE BALANCE ADJUSTMENT

BACKGROUND

1. Technical Field

The present disclosure relates to an image processing technology, and in particular, to a white balance process for digital color images.

2. Description of Related Art

Generally speaking, colors that reflect off an object depend on color of light sources. A human brain is able to detect and correct this type of color change. Whether during a sunny day, a cloudy day, or in a room with light bulbs or fluorescent lamps, a human eye can adapt to the changes in color under different light sources and it will not affect the way in which humans perceive white objects. However, "white color" generated by different light sources is perceived differently by a digital image capturing device. For example, a photo tends to be yellowish if it is taken in a room illuminated with tungsten lamps (light bulbs), and it tends to be lightly bluish or reddish if it is taken in other environments. In order to make the colors in the photos consistent with the colors perceived by human eye, the digital image capturing device has to mimic the human brain and adjust the colors according to the light source. It has to define the white color so that it is the same in the photos as it is in the white color perceived by the human eyes. This type of adjustment is known as "white balance."

In prior art, a color histogram stretching (CHS) method is used to adjust the white balance for the image, raw histograms of red (R), green (G), and blue (B) three channels are re-quantized to a range of 0-255, adjusted result shows that this method has characteristics with smaller error and immediacy. On the histograms, directions of a larger color scale and a smaller color scale define two identical width ranges as thresholds, average values of the color scale corresponding to pixels within these two thresholds as a reference black and a reference white, separately. Color scale is remapped according to the reference black and the reference white to complete an auto white balance for the image. Under the methodology, the reference black and the reference white can be found, but unknown thresholds of the reference black and the reference white are fixed, thus an obtained reference black and reference white are easily limited and fixed in a certain range. In contrast, when the histogram distribution is normal, the obtained reference black and reference white are relatively stable and less susceptible to noise; but if the main peak of the histogram shifts to left, an excessively large reference white will be obtained. On the contrary, when the main peak of the histogram shifts to right, an excessively small reference black will be obtained. As a result, a contrast of the image is poor after white balance adjustment. Therefore, it is necessary to provide a white balance adjustment method with an adjustable threshold.

DETAILED DESCRIPTION

Figure 1:
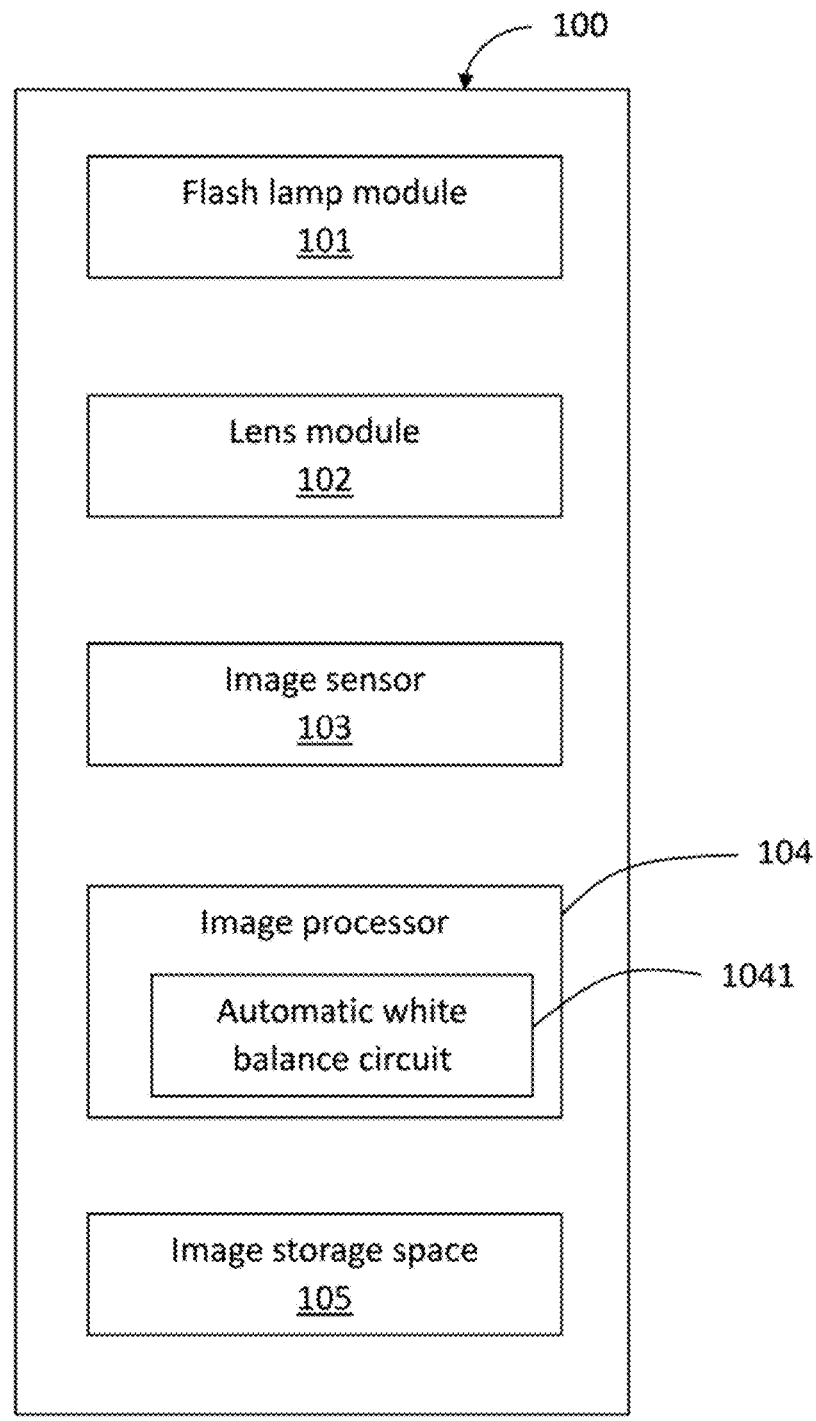
FIG. 1 is an image capturing device using the white balance adjustment method of the present embodiment.

In FIG. 1, an image capturing device 100 using the white balance adjustment method of the present embodiment includes a lens module 102, an image sensor 103, a image processor 104, and an image storage space 105. The image sensor 103 is electrically connected to the image processor 104. The lens module 102 and the image sensor 103 cooperatively capture an image, the image processor 104 receives the image from the image sensor 103, and the image storage space 105 is used to store a processed image. The image storage space 105 may be physical storage space, such as flash memory or random access memory, or a cache.

The image processor 104 has an automatic white balance circuit 1041 to perform the white balance adjustment method of the present embodiment. The image capturing device 100 further includes a flash lamp module 101.

Figure 2:
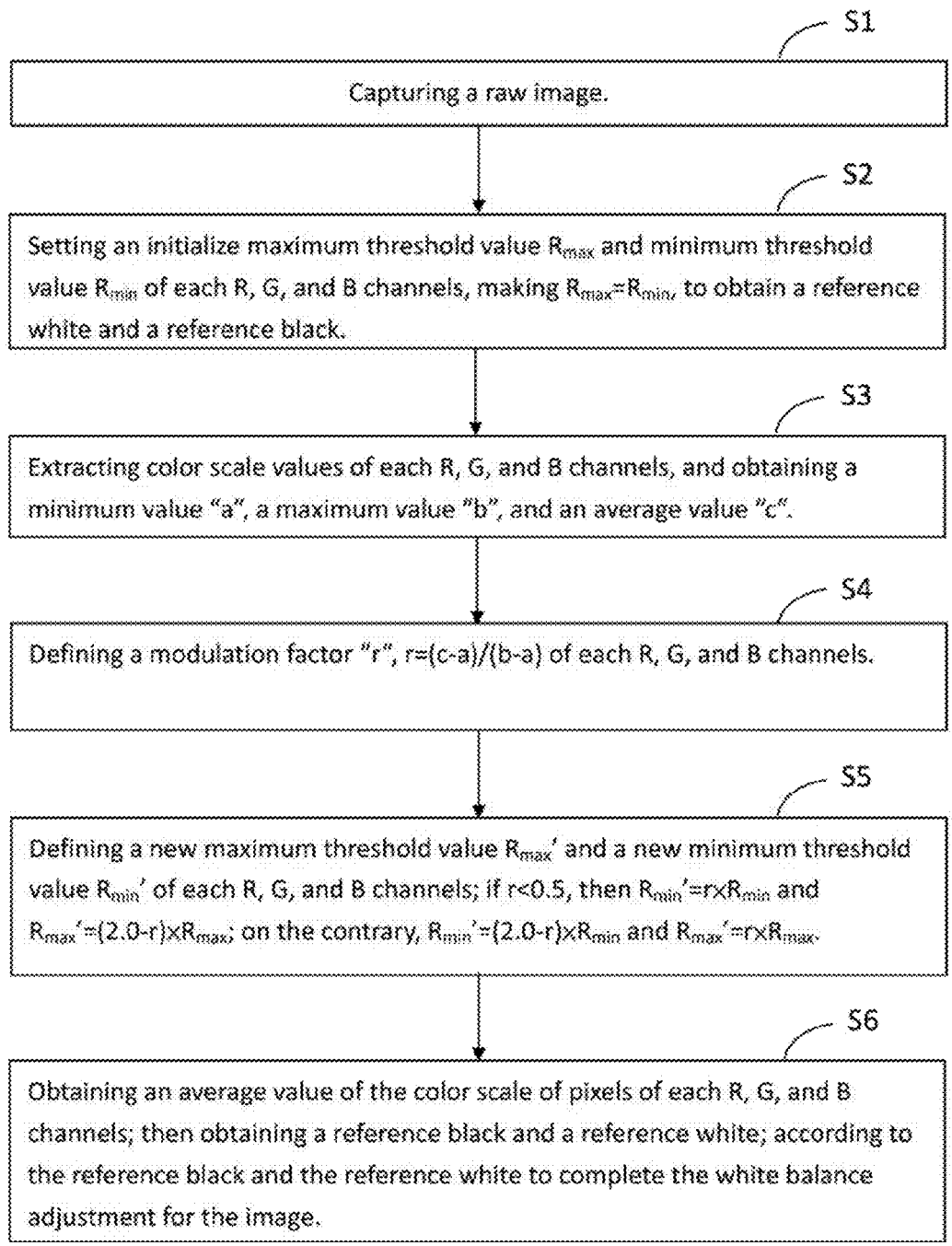
FIG. 2 is a flowchart of the present embodiment a white balance adjustment method.

FIG. 2 shows a white balance adjustment method of the present disclosure. In this embodiment, the white balance adjustment method is used to adjust white balance for an image. The white balance adjustment method for the image capturing device 100, includes the following steps:

In step S1, a raw image is captured by the image capturing device 100.

In step S2, raw image is loaded and an initial maximum threshold value $R_{max}$ and minimum threshold value $R_{min}$ of each R, G, and B channels of the raw image are set, making $R_{max}=R_{min}$, an average value of color scale within the maximum threshold value represents a reference white, an average value of color scale within the minimum threshold value represents a reference black.

In step S3, color scale values of each R, G, and B channels of the raw image are extracted, and a minimum value "a", a maximum value "b", and an average value "c" of the color scale values corresponding to the channels are obtained.

In step S4, a modulation factor "r", $r=(c-a)/(b-a)$ of each R, G, and B channels are defined.

In step S5, a new maximum threshold value $R_{max}'$ and a new minimum threshold value $R_{min}'$ of each R, G, and B channels are defined, if $r<0.5$, then $R_{min}'=r\times R_{min}$ and $R_{max}'=(2.0-r)\times R_{max}$; on the contrary, $R_{min}'=(2.0-r)\times R_{min}$ and $R_{max}'=r\times R_{max}$.

In step S6, an average value of the color scale within the new maximum threshold value $R_{max}'$ and the new minimum threshold value $R_{min}'$ of each R, G, and B channels are obtained, and then obtain a reference black and a reference white corresponding to the channels. According to the reference black and the reference white of R, G, and B channels, a color histogram stretching (CHS) method is adapted to adjust the white balance of each corresponding channels.

In the step S2, the initial maximum threshold value $R_{max}$ and minimum threshold value $R_{min}$ can be defined, such as $R_{max}=R_{min}=0.01$, $R_{max}=R_{min}=0.02$, and $R_{max}=R_{min}=0.03$, etc. In the present embodiment, $R_{max}=R_{min}=0.01$. The values may be defined by a user or pre-determined.

The maximum threshold value $R_{max}$ is to obtain a certain number of pixels from the maximum color scale toward a direction that color scale gradually decreases, where a ratio between the total number of the obtained pixels and the total number of pixels of the raw image is the maximum threshold value $R_{max}$. The pixels within a range corresponding to the maximum threshold value $R_{max}$ are the certain number of pixels, which are obtained from the maximum color scale toward a direction that color scale gradually decreases.

The minimum threshold value $R_{min}$ is to obtain a certain number of pixels from the minimum color scale toward a direction that color scale gradually increases, a ratio between the total number of the obtained pixels and the total number of pixels of the raw image is the minimum threshold value $R_{min}$. The pixels within a range corresponding to the minimum threshold value $R_{min}$ are the certain number of pixels, which are obtained from the minimum color scale toward a direction that color scale gradually increases.

In the present embodiment, $R_{max}=R_{min}$, means that both of the number of pixels within the corresponding range of the minimum threshold value $R_{min}$ and the maximum threshold value $R_{max}$ are the same. But, the color scale of the pixels within the corresponding range of the minimum threshold value $R_{min}$ and the maximum threshold value $R_{max}$, their spanned ranges may be different.

In the step S3, a raw image comprises a plurality of pixels, and then according to a color filter covered on a surface of image sensor, the raw image can be represented by using original data of sub-pixels red (R), green (G), and blue (B).

In the embodiment, the color scales of R channel in the raw image are first extracted, then the color scales are compared to obtain the maximum value and the minimum value, the average value is calculated by using the maximum value and the minimum value. The color scales of G channel and B channel are separately extracted from the raw image referring to the method of R channel, then are compared and are calculated to obtain the maximum value, the minimum value, and the average value of the G channel and the B channel.

In this step, there is no limited to an extraction and calculation sequence of the R, G, and B channels; for example, the color scale of B channel or G channel can be extracted first, then to compare and calculate their maximum value, minimum value and average value of each channels. In addition, it is also possible to first extract the color scale of each R, G, and B channels, and then calculate the corresponding values of each channels.

In the step S4, a modulation factor "r" corresponds to the channels is obtained by a formula r=(c−a)/(b−a) according to the obtained maximum value, minimum value and average value. In this step, there is no limited to the calculation sequences of the modulation factor "r" corresponding to the R, G, and B channels.

In the step S6, the new maximum threshold value and the new minimum threshold value of each channels are used to calculate the average value of color scales, thereby obtaining the reference black and the reference white corresponding to the channels, using the reference black, the reference white and the CHS method to complete the white balance adjustment for the R, G, and B channels.

In the CHS method, each of the pixels in the raw image is adjusted according to the reference black and the reference white, the color scale of the pixels after white balance adjusted is as follow:

$$\frac{C-L}{H-L} \times M,$$

where "C" represents the color scale of each pixels in the raw image, "H" represents the reference white, "L" represents the reference black, and "M" represents 255 or 1023. The pixels in the R, G, and B channels should use corresponding H and L. For example, to calculate the color scale of the R channel after pixel adjusted, the H and L should correspond to the R channel.

The sequence is not limited to the white balance adjustment in the step S3-S6 of the R, G, and B channels. For example, the white balance adjustment for the R channel can be done first, and then the white balance adjustment of the G channel is completed, finally the white balance adjustment of the B channel, in accordance with G, R, and B sequence, or B, G, and R sequence is completed.

Figure 3A:
FIG. 3A is an image before white balance adjustment.
Figure 3B:
FIG. 3B is an image that has achieved white balance adjustment by using a color histogram stretching (CHS) method.
Figure 3C:
FIG. 3C is an image that has achieved white balance adjustment by using a white balance adjustment method.

The image shown in FIG. 3A is actually bluish, the reason human eyes detect the color as white is because they correct the color. The image after the white balance process by using color histogram stretching (CHS) method will produce a more satisfactory image like FIG. 3B, but with low contrast. In the present embodiment white balance adjustment method, the maximum threshold value and the minimum threshold value of the R, G, and B channels are obtained according to the maximum value, the minimum value and the average value of corresponding color scale of the channels. Different channels according to their own color scales will have different maximum threshold value and minimum threshold value, and then according to the average value of the color scale corresponding to the adjusted maximum threshold value and the minimum threshold value, to adjust the white balance for the corresponding channels. Therefore, the present white balance adjustment method can better reflect a real situation of the image as shown in FIG. 3C, also can improve the contrast of the image after white balance adjusted.

Although the present disclosure has been specifically described on the basis of these exemplary embodiments, the disclosure is not to be construed as being limited thereto. Various changes or modifications may be made to the embodiments without departing from the scope and spirit of the disclosure.

What is claimed is:

1. A white balance adjustment method of an image capturing device, the method comprising:
    S1: capturing a raw image using the image capturing device;
    S2: setting an initial maximum threshold value $R_{max}$ and minimum threshold value $R_{min}$ of each R, G, and B channels of the raw image, making $R_{max}=R_{min}$, wherein an average value of color scale within the maximum threshold value represents a reference white, and an average value of color scale within the minimum threshold value represents a reference black;
    S3: extracting color scale values of each R, G, and B channels of the raw image, and obtaining a minimum value "a", a maximum value "b", and an average value "c" of the color scale values corresponding to the channels;
    S4: defining a modulation factor "r", r=(c−a)/(b−a) of each R, G, and B channels;
    S5: defining a new maximum threshold value $R_{max}'$ and a new minimum threshold value $R_{min}'$ of each R, G, and B channels; if r<0.5, then $R_{min}'=r \times R_{min}$ and $R_{max}'=(2.0-r) \times R_{max}$; on the contrary, $R_{min}'=(2.0-r) \times R_{min}$ and $R_{max}'=r \times R_{max}$; and
    S6: obtaining an average value of the color scale within the new maximum threshold value $R_{max}'$ and the new minimum threshold value $R_{min}'$ of each R, G, and B channels; and obtaining the reference black and the reference white corresponding to the channels; according to the reference black and the reference white of R, G, and B channels, a color histogram stretching (CHS) method is adapted to adjust the white balance of each corresponding channels.

2. The white balance adjustment method as claimed in claim 1, wherein the initial maximum threshold value $R_{max}$ and minimum threshold value $R_{min}$ are equal to 0.01.

3. The white balance adjustment method as claimed in claim 2, wherein the color scale of pixels after white balance adjusted is as follow:

$$\frac{C-L}{H-L} \times M,$$

where "C" represents a color scale of each pixels in the raw image, "H" represents the reference white, "L" represents the reference black, and "M" represents 255 or 1023.

* * * * *